(12) United States Patent
Birzer et al.

(10) Patent No.: US 8,155,781 B2
(45) Date of Patent: Apr. 10, 2012

(54) AUTOMATION SYSTEM AND METHOD FOR MOVEMENT CONTROL OF AT LEAST ONE MOVEABLE MACHINE ELEMENT

(75) Inventors: Johannes Birzer, Stulln (DE); Tino Heber, Freiberg (DE); Raimund Kram, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 2107 days.

(21) Appl. No.: 10/500,229

(22) PCT Filed: Dec. 27, 2002

(86) PCT No.: PCT/DE02/04744
§ 371 (c)(1),
(2), (4) Date: Jun. 25, 2004

(87) PCT Pub. No.: WO03/056400
PCT Pub. Date: Jul. 10, 2003

(65) Prior Publication Data
US 2005/0131563 A1 Jun. 16, 2005

(30) Foreign Application Priority Data
Dec. 28, 2001 (DE) .................................. 101 64 496

(51) Int. Cl.
| | |
|---|---|
| G05B 19/25 | (2006.01) |
| G05B 19/23 | (2006.01) |
| G05B 19/18 | (2006.01) |
| G05B 15/00 | (2006.01) |
| G05B 19/42 | (2006.01) |
| G06F 19/00 | (2011.01) |
| B25J 9/22 | (2006.01) |

(52) U.S. Cl. ............... 700/189; 700/61; 700/63; 700/83; 700/86; 700/182; 700/186; 318/568.13; 318/573; 318/574

(58) Field of Classification Search ............ 318/568.13, 318/573–574, 560, 567; 700/61, 63, 83, 700/86, 182, 245, 159, 184, 186–189
See application file for complete search history.

(56) References Cited

U.S. PATENT DOCUMENTS

| | | | | |
|---|---|---|---|---|
| 4,663,726 A | * | 5/1987 | Chand et al. | 700/252 |
| 4,772,831 A | * | 9/1988 | Casler et al. | 318/568.15 |
| 4,773,025 A | * | 9/1988 | Penkar et al. | 700/261 |
| 4,963,805 A | * | 10/1990 | Suzuki et al. | 318/569 |
| 5,028,855 A | * | 7/1991 | Distler et al. | 700/187 |
| 5,227,978 A | * | 7/1993 | Kato | 700/189 |
| 5,229,951 A | * | 7/1993 | Sugita et al. | 700/187 |
| 5,236,485 A | | 8/1993 | Leweringhaus et al. | |
| 5,321,623 A | * | 6/1994 | Ensenat et al. | 700/189 |
| 5,434,489 A | * | 7/1995 | Cheng et al. | 318/568.15 |
| 5,457,370 A | * | 10/1995 | Edwards | 318/571 |

(Continued)

FOREIGN PATENT DOCUMENTS

DE      43 23 831 A1    2/1995

(Continued)

*Primary Examiner* — Ronald D Hartman, Jr.
(74) *Attorney, Agent, or Firm* — King & Spalding LLP

(57) ABSTRACT

In order to improve movement control in an automation system for movement control, profiles for movement control are freely defined via functions. Polynomial interpolations or spline interpolations are used for the defined functions, the interpolations being of a higher degree. The profile for movement control has a command variable and a secondary variable, at least one of which is time-based or position-related.

21 Claims, 2 Drawing Sheets

U.S. PATENT DOCUMENTS

| | | | | |
|---|---|---|---|---|
| 5,726,896 | A * | 3/1998 | Jia et al. | 700/187 |
| 5,731,820 | A * | 3/1998 | Broekhuijsen | 345/442 |
| 5,923,132 | A * | 7/1999 | Boyer | 318/34 |
| 5,955,856 | A * | 9/1999 | Sato et al. | 318/560 |
| 6,300,738 | B1 * | 10/2001 | Weinhofer | 318/609 |
| 6,317,651 | B1 * | 11/2001 | Gerstenberger et al. | 700/245 |
| 6,401,006 | B1 * | 6/2002 | Mizuno et al. | 700/189 |
| 6,539,275 | B1 * | 3/2003 | Mizuno et al. | 700/170 |
| 6,677,721 | B2 * | 1/2004 | Grohmann et al. | 318/569 |
| 6,701,210 | B2 * | 3/2004 | Heber et al. | 700/189 |
| 6,735,495 | B2 * | 5/2004 | Munz | 700/189 |
| 6,782,306 | B2 * | 8/2004 | Yutkowitz | 700/189 |
| 6,895,299 | B2 * | 5/2005 | Red et al. | 700/186 |
| 6,922,606 | B1 * | 7/2005 | Yutkowitz | 700/187 |
| RE39,907 | E * | 11/2007 | Hong | 318/571 |
| 7,801,639 | B2 * | 9/2010 | Korajda et al. | 700/193 |
| 7,818,087 | B2 * | 10/2010 | Birzer et al. | 700/186 |
| 7,853,335 | B2 * | 12/2010 | Korajda et al. | 700/3 |
| 2002/0074964 | A1 * | 6/2002 | Quaschner et al. | 318/560 |
| 2003/0033050 | A1 * | 2/2003 | Yutkowitz | 700/189 |
| 2003/0078692 | A1 * | 4/2003 | Heber et al. | 700/159 |
| 2003/0193522 | A1 * | 10/2003 | Chandhoke | 345/764 |
| 2004/0019394 | A1 * | 1/2004 | Red et al. | 700/56 |
| 2004/0085311 | A1 * | 5/2004 | Lee et al. | 345/419 |
| 2004/0267404 | A1 * | 12/2004 | Danko | 700/245 |
| 2005/0035734 | A1 * | 2/2005 | Haunerdinger et al. | 318/574 |
| 2005/0159840 | A1 * | 7/2005 | Lin et al. | 700/245 |
| 2006/0095142 | A9 * | 5/2006 | Evans et al. | 700/2 |
| 2009/0099738 | A1 * | 4/2009 | Danko | 701/50 |

FOREIGN PATENT DOCUMENTS

| | | |
|---|---|---|
| DE | 10065422 | 7/2002 |
| EP | 0 263 409 A1 | 4/1988 |
| EP | 0 573 903 A1 | 12/1993 |

* cited by examiner

AUTOMATION SYSTEM AND METHOD FOR MOVEMENT CONTROL OF AT LEAST ONE MOVEABLE MACHINE ELEMENT

FIELD OF THE INVENTION

The present invention relates to an automation system for controlling the movement of at least one movable machine element, the automation system being programmable.

BACKGROUND OF THE INVENTION

In order to realize movement controls of at least one machine element, for example, in a production machine, such as, a textile machine, a packaging machine, a plastics injection-molding machine, a machine tool, or in a manipulator, predefined profile types are used, for example, in positioning movements. Predefined profile types, which reproduce for example:
  a displacement over a time
  a speed over time
  an acceleration over time
  a shift over time
  etc.
are known from conventional automation systems. An example of an automation system is the SINUMERIK 840D/840Di or 810D. In the 09.01 edition of the associated programming manual, it is described for example on page 5-190 how acceleration behavior can be set. The predefined nature of the profile types causes restrictions with respect to the available forms of profile.

If in the case of automation systems, for example, for production machines or machine tools, cam disk functions are used, these can be described by mathematical interpolation methods. One example of this is the German laid-open patent application DE 10065422A1. The cam disk is followed in accordance with a chosen cam disk profile. However, only relationships of positions of movable machine elements are recorded in the cam disk profiles. The cam disk profile is independent of the profile type for the movement control, the movement control having a time basis, such as for example a speed. Profiles for movement controls are also referred to as traversing profiles. The object of the present invention is to improve movement control.

SUMMARY OF THE INVENTION

According to the present invention, this object is achieved by an automation system for movement control with the aid of profiles, the profiles being processed on a time basis or position basis and it being possible for their argument variables and/or function variables to be used without units.

The profiles can be freely determined by interpolations, so that a user of the automation system can freely select profiles and does not have to resort to standard profiles. A polynomial interpolation or else a spline interpolation can be used as the interpolation. The absence of units makes it possible for different variables to be linked to one another, one variable being the command variable and another variable being the respective secondary variable. In this way, movement profiles or traversing profiles can be freely determined.

The free determinability of the command variable and secondary variable also makes it possible for combinations of different variables to be stored in one profile. The command variable is, for example: a position, a speed, a pressure, a force, a moment, or some other variable. For its part, the secondary variable of the profile is then also in turn, for example: a position, a speed, a pressure, a force, a moment or some other variable.

The solution for achieving the object is also accomplished by an automation system for controlling the movement of at least one movable machine element in which a profile for movement control can be prescribed as a function of a higher degree, the profile having at least one command variable and a secondary variable.

The command variable represents, for example, a physical variable that is different from the secondary variable, at least one of the variables, that is the command variable or the secondary variable, being a location-dependent variable. The prescribable function of a higher degree can advantageously be freely prescribed. The free prescribability relates for example to a free parameterizability of a function of a higher degree, for example, for coefficients, or to the free creatability of the function. From the automation system or from an engineering system on which such a function can also be generated for example, there are in this case, for example, specifications with respect to the maximum level of the degree of the function.

In an advantageous embodiment, it is made possible for a user to graphically prescribe a profile or else segments, i.e. portions, of a profile and to instigate the generation of the function to be carried out by the automation system or by the engineering system. In this case, a free parameterization or a free creation of the function is performed by the automation system or by the engineering system itself.

The function of a higher degree is, for example, a spline interpolation or a polynomial interpolation.

The polynomial interpolation is, for example, advantageously able to be formed up to at least the 6th order. The order in this case indicates the degree. A further advantage is obtained from the use of trigonometric elements in the function.

If the function has a time-dependent variable, this time-dependent variable is, for example, time itself or a function of time, such as a speed, an acceleration, a shift or the like as well as other nth derivatives based on time. Apart from a time-dependent movement, other physical variables, such as, for example, a pressure or a temperature, are sometimes also dependent on time and consequently form a variable of the movement profile to be described.

A flexibly optimizable movement control allows highly dynamic and exact movements to be realized. The movement control is in this case advantageously of any desired type. As already described above, a flexibly optimizable movement control can also be realized in particular by freely definable profiles or profile types, in particular on a single axis, for example, of the machine tool or of the production machine.

In an advantageous refinement, the free profile can be combined with a basic movement control on one axis. This relates for example to the: positioning, moving, stopping or synchronous running. Free profiles can advantageously be combined as desired with predefined profiles or with the basic movement control.

The automation system can also be formed in such a way that two or more profiles can be combined with one another, at least one profile being a free profile.

A profile can be subdivided into portions, a portion being a segment. At least two segments form a common profile, it also being possible for a segment itself to be represented as a profile by a function of a higher degree.

Like a cam disk function, the profile can also be described, for example, by portions, in that individual successive profile portions are defined by segments and/or points and an interpolation is carried out between such profile portions on the basis of a prescribable interpolation rule, commands for prescribing and/or inserting points, segments and interpolation rules with respect to the running time being provided. If segments are prescribed by a combination of a polynomial and a trigonometric element, this is also advantageous, because in this way the profile can continuously be derived. A combination of a polynomial with a polynomial degree of at least six and a sine function as a trigonometric element has proven to be particularly favorable here for the definition of segments of a profile. Further advantageous refinements of the invention use linear connections or cubic splines or Bezier splines as an interpolation rule for the connection between successive profile portions. Such splines are made up piece by piece from polynomials.

At least two individual unconnected segments of a profile which are defined by a polynomial interpolation or by a spline interpolation as a polynomial function or as a spline function can be connected by a transitional segment, the transitional segment being at least a function of a spline interpolation.

In an advantageous way, a standard profile predefined by the automation system or the engineering system can also be selected as a segment.

A profile defined in this way for movement control is advantageously available in a memory of the automation system. By the definition of functions for a profile of a movement control, a saving in computing time is also advantageously obtained for an automation system, since profiles are created offline and the information with respect to the movement control does not have to be computed online in the case where conventional traversing profiles are used.

A saving in computing time for the automation system is also obtained, for example, by the fact that, in the event of cyclical repetition of the profile, it is not necessary as before for the movement control to newly calculate in each case derivatives of a traversing profile. This also increases the cost-effectiveness of the automation system.

In an advantageous refinement, it is made possible in the case of the automation system to impose a flexible influence on the movement control of at least one axis at every point in time by means of a user program of an automation system. With the aid of a user program, the creatability and/or modifiability of the profiles in the controller, i.e. in the automation system, is made possible.

Of course, adequately high-grade profile representation in the automation system is advantageous. This relates to the basic movement control, and also the movement control with the aid of self-created profiles. In this case, in particular interpolations of a higher degree, such as, for example, a polynomial function of the 3rd, 4th, 5th, 6th or higher degree, are of advantage. Polynomial functions with a trigonometric element have additional advantages, for example, with respect to their derivability.

The profiles can be applied to various movement status variables of the axis, for example, in the case of speed profiles via the axial position.

In this way, continuity and/or combinatorial analysis between predefined profile types and free profiles is made possible to achieve optimum movement sequences.

A freely definable profile for a movement control can be used for example in the case of:
  a freely programmable automation or motion control system for production machines;
  a multitask system as an automation system, the individual tasks by the multitasking system having different properties (cyclical new beginning at program end or restart after a defined time, sequential, interrupt-driven).

The automation system also has, for example, the following properties:
  a user program or user programs can be freely assigned to a task in the automation system;
  commands for motion control can be freely downloaded from the user programs and their status and the status of the movements brought about by these commands can be freely monitored;
  already existing basic movement systems with prescribed profile types and management commands for the axis, which provide the basis for sequential, superseding and superposing movements;
  functionality for the creation of high-grade flexible cam disks by means of specific tools or directly from the user program.

In an advantageous way, according to the invention, a point from the following enumeration is also executed in an automation system:
  provision of profiles at the axis which can be processed on a time basis or a position basis;
  profiles of which the argument and function variables are without units, and so can be applied flexibly to position, speed, pressure or moment;
  profiles freely definable on the basis of polynomials of the sixth degree with a trigonometric element;
  profiles flexibly activatable by means of programs/commands in the multitasking system, with superseding, sequential and/or superposing functionality;
  every movement can be transformed in a directly superseding or successively sequential manner into a profile movement, or one profile movement can in the same way be superseded by another;
  if profile processing is stopped, continued or there is a resumption within a profile, adjustable dynamic ramps are used to run up to the profile or run down from profile processing.

In this way it is made possible to follow free, production-based or time-based profiles on the axis of an automation system. The variables of a profile, that is to say the profile values, may relate, for example, to position, speed, pressure, force, or moments. A profile can be combined, so that it can be used:
  in combination with a flexible activation for superseding a straight current movement;
  in combination with the flexible transformation into another movement;
  in combination with the flexible superposition on other movements.

The combinability, i.e. the sequential sequence of segments which in themselves represent a profile and, for free profile processing, are defined by a user as a function or as a graphic, with interpolation functions existing in the automation system is also advantageously included.

The profile for movement control can be formed in an advantageous way as a scalable signal, it also being possible to provide a possibility for prescribing a displacement of the profile. A profile of good resolution can be achieved for example by a polynomial of the 6th degree with trigonometric elements.

The profile according to the invention for movement control is, for example, possible directly from the user program and/or also by means of a graphic tool in the engineering system:
  which allows creation of the profile directly or via its derivative variables, which supports creation by means of point specifications or subfunction specifications, and completes the profile by means of linear or cubic interpolation.

Activation or deactivation of such profiles is sometimes also made possible directly by voice commands of a freely programmable automation system, the profiles originating, for example, from any desired programs of a multitasking system.

Apart from the automation system, the invention also relates to a corresponding method, for which reference is made to the foregoing description. In the case of the method for controlling the movement of at least one movable machine element of an automated machine tool or an automated production machine or an automated manipulator, a profile for the movement control is prescribed as a function of a higher degree and at least freely parameterized or created, the profile having at least one command variable and a secondary variable, wherein a physical variable that is different from the secondary variable is determined as the command variable and wherein a time-dependent variable or a location-dependent variable is determined as at least one of the variables.

Advantageous refinements of the method are provided by the claims 11 to 19.

Irrespective of whether a device as an automation system or the method for movement control is considered, the advantageous refinements already presented are obtained, for example in that:
  the polynomial is also formed by a trigonometric function,
  different profiles are transformed into one another,
  the profile is defined without any units,
  profiles of an axis are processed on a time basis or position basis.

An advantageous use of the automation system according to the invention or of the method according to the invention for movement control is obtained for example in the case of a machine tool or a production machine (for example, packaging machines or plastics machines) or in the case of a manipulator.

The prescribability of a function for a profile makes it possible to realize a highly flexible and optimizable movement control on at least one axis of an aforementioned machine or automatic unit.

Apart from the automation system, the invention also relates to a corresponding method and a corresponding engineering system, for which reference is also made to the foregoing description. The engineering system serves for creating a profile for movement control as a freely creatable function of a higher degree, the profile having at least one command variable and a secondary variable, the command variable representing a physical variable that is different from the secondary variable and at least one of the variables being a time-dependent variable or a location-dependent variable.

It is advantageous for the user if the engineering system converts a profile that is graphically defined by the user into a function which is freely parameterized or created by the system itself.

BRIEF DESCRIPTION OF THE DRAWINGS

Further advantages and details of the invention emerge from the following description of an exemplary embodiment and in connection with the figures.

DETAILED DESCRIPTION OF THE INVENTION

Figure 1:
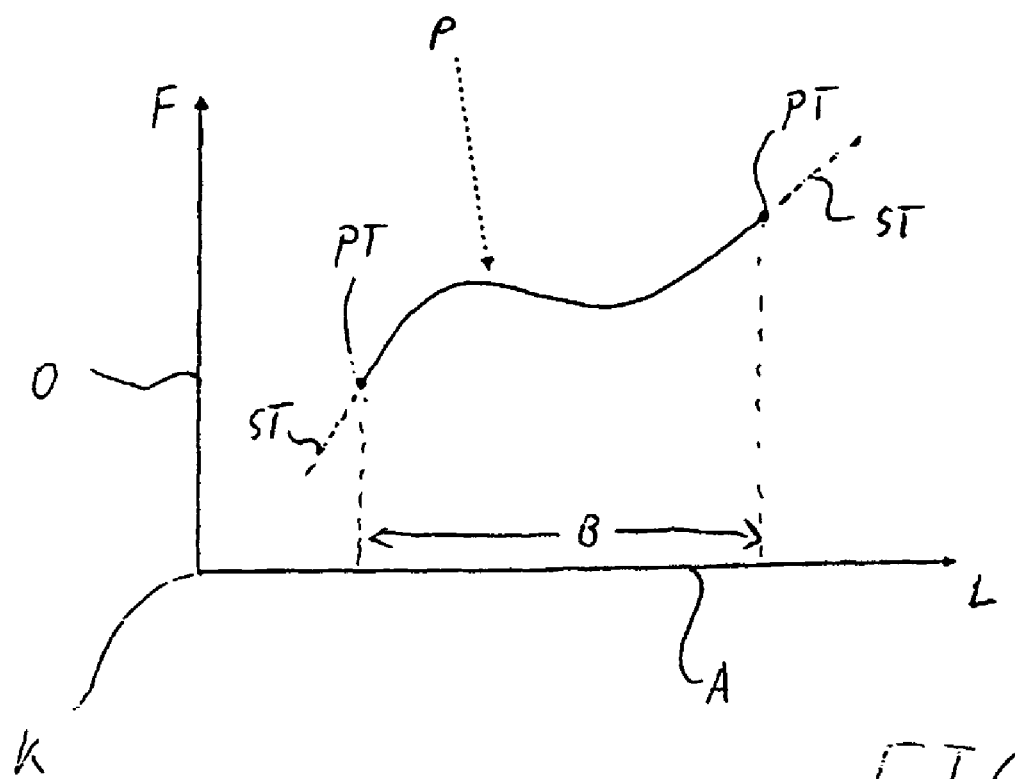
FIG. 1 shows a user-defined profile for movement control according to an embodiment of an aspect of the present invention.

The representation according to FIG. 1 shows a profile P for movement control. The profile P is represented in a system of coordinates K, a command variable L being plotted on an x-axis A and a secondary variable F being plotted on the y-axis O. A time or a function dependent on time or some other physical variable is used as the command variable L. The secondary variable F is, for example, a speed or an nth derivative of the speed on the basis of time. The profile P shown is intended for example to be a polynomial of the 6th degree with a trigonometric element. A freely definable profile P or freely definable profiles which are sequential, superseding and/or superposing can be executed in combination with movements programmed in any other desired way. The profile is delimited in FIG. 1 by points PT and is consequently only defined in a range B. The definition range can also be extended beyond the points PT. A possible continuation of the profile P is represented by a dashed line ST.

The free definability for example of traversing profiles as a type of movement profile with the aid of interpolations of a higher degree makes it possible for an automation system formed in this way to be formed very flexibly.

Figure 2:
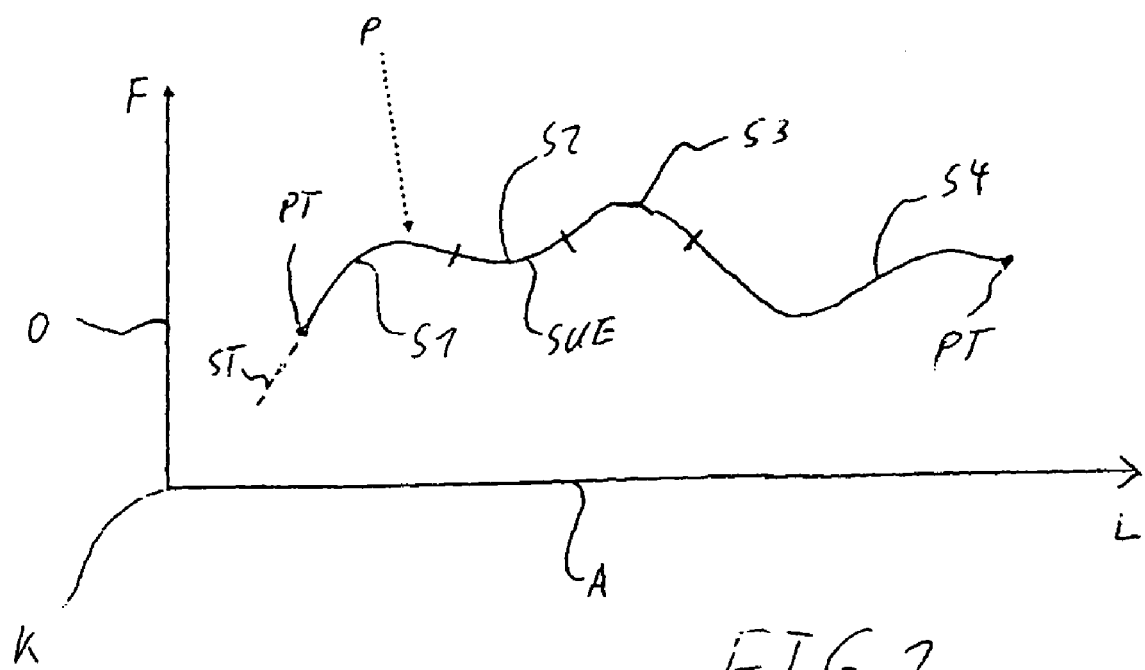
FIG. 2 shows a user-defined profile comprising various segments according to an embodiment of an aspect of the present invention.

The representation according to FIG. 2 shows along the lines of FIG. 1 the subdivision of a profile P into segments S1, S2, S3, S4. The segments S1, S2, S3, S4 follow on from one another and together form the profile P. Each segment S1, S2, S3, S4 may be based on different interpolation functions (polynomial interpolation, spline interpolation) or on a prescribed profile. A segment like the segment S2 may also act as a transitional segment SUE for two segments S1 and S3. Transitional segments can advantageously be generated in an automated manner.

The invention claimed is:

1. A programmable automation system for controlling the movement of at least one movable machine element, the automation system comprising:
  a memory;
  a profile, stored in the memory, for movement control that is prescribed as a function of a higher degree, the profile comprising at least one command variable and a secondary variable, the command variable representing a physical variable that is of a different type from the secondary variable and at least one of the variables comprising a time-dependent variable, wherein the profile is created based on the command variable, and wherein the profile is defined without any units, and wherein the profile comprises a combination of a plurality of segments, the plurality of segments of the profile formed from mathematical functions, and wherein at least two individual unconnected segments of polynomial functions associated with the plurality of segments can be connected with a transitional segment and the transitional segment comprises at least a function of a spline interpolation; and
  a program for activating the profile.

2. The automation system according to claim 1, wherein the profile for movement control is one of the group consisting of freely parameterized and created.

3. The automation system according to claim 1, wherein the function of a higher degree comprise a spline interpolation.

4. The automation system according to claim 1, wherein the function of a higher degree comprise a polynomial interpolation.

5. The automation system according to claim 4, wherein the polynomial interpolation comprises an order of up to at least a 6th order.

6. The automation system according to claim 1, wherein the function has a trigonometric element.

7. The automation system according to 1, wherein the movement control of the at least one movable machine element is associated with an axis, wherein the axis is associated with the profile.

8. The automation system according to claim 1, wherein the at least one program accesses the profile from memory for activating the profile.

9. The automation system according to claim 1, wherein the command variable is selected from the group consisting of a position, a speed, a pressure, a force, and a moment.

10. A method for controlling the movement of at least one moveable machine element of one of the group consisting of an automated machine tool, an automated production machine, and an automated manipulator, the method comprising the steps of:
   (a) providing a profile for movement control as a function of a higher degree that is one selected from the group consisting of a freely parameterized profile and a created profile, wherein the profile is defined without any units, and wherein a plurality of segments associated with the profile are formed by functions, after which the profile is formed by a combination of the plurality of segments, wherein at least two individual unconnected segments of polynomial functions associated with the plurality of segments can be connected with a transitional segment and the transitional segment comprises at least a function of a spline interpolation;
   (b) providing at least one command variable and a secondary variable, wherein a physical variable that is of a different type from the secondary variable is determined as the command variable;
   (c) determining a time-dependent variable as at least one of the command variable and the secondary variable; and
   (d) controlling, by a computer, the movement of the at least one moveable machine element based upon the command variable and the secondary variable.

11. The method according to claim 10, wherein a spline interpolation is used as the function of a higher degree.

12. The method according to claim 10, wherein a polynomial interpolation is used as the function of a higher degree.

13. The method according to claim 10, wherein the function is given a trigonometric element.

14. The method according to claim 10, wherein a physical variable associated with the position of an axis is described by the profile.

15. The method according to claim 10, wherein a physical variable associated with the movement of an axis is described by the profile.

16. The method according to claim 10, wherein the profile is defined from a user program during a program processing phase.

17. The method according to claim 10, wherein the profile is created by a graphic tool in an engineering system.

18. An engineering system for creating a profile for movement control as a freely creatable function of a higher degree, the system comprising:
   a user program for creating the profile to be stored in memory, wherein the profile is based on at least one selected command variable and a secondary variable, the command variable representing a physical variable that is of a different type from the secondary variable and at least one of the variables comprising a time-dependent variable; and
   a memory to store the profile,
   wherein the profile is defined without any units, and wherein a plurality of segments associated with the profile are formed by functions, after which the profile is formed by a combination of the plurality of segments, wherein at least two individual unconnected segments of polynomial functions associated with the plurality of segments can be connected with a transitional segment and the transitional segment comprises at least a function of a spline interpolation.

19. The automation system according to claim 18, further comprising at least one program for activating the profile.

20. The automation system according to claim 19, wherein the at least one program accesses the profile from memory for activating the profile.

21. The automation system according to claim 18, wherein the command variable is selected from the group consisting of a position, a speed, a pressure, a force, and a moment.

* * * * *